United States Patent [19]
Grosseau

[11] 3,802,460
[45] Apr. 9, 1974

[54] IMPROVEMENTS IN FLUID VALVE MEANS HAVING A DIFFERENTIAL PISTON ASSOCIATED WITH A DEAD BODY

[75] Inventor: Albert Grosseau, Paris, France
[73] Assignee: Societe Anonyme Automobiles Citroen, Paris, France
[22] Filed: Aug. 9, 1972
[21] Appl. No.: 279,263

[30]  Foreign Application Priority Data
Aug. 13, 1971  France ............................. 71.29745

[52] U.S. Cl. ................................. 137/494, 137/538
[51] Int. Cl. ............................................ F16k 31/12
[58] Field of Search ......................... 137/538, 494

[56]  References Cited
UNITED STATES PATENTS
2,767,726  10/1956  Feucht .............................. 137/494
1,789,388  1/1931  McMillan .......................... 137/494
3,523,420  8/1970  Strauff ........................... 60/54.5 R FOREIGN PATENTS OR APPLICATIONS
870,655  2/1958  Great Britain ..................... 137/494
526,102  10/1920  France ............................... 137/538

Primary Examiner—Edgar W. Geoghegan
Assistant Examiner—A. M. Zupcic
Attorney, Agent, or Firm—Wenderoth, Lind & Panack

[57]  ABSTRACT

A fluid valve means having a differential piston associated with a dead body. The differential piston has a plurality of stepped portions of different diameters. A cylinder is provided having an accurate bore of at least one of these diameters in which one portion of the piston is slidable. A further bore is provided in the cylinder having a clearance machined to a dimension with large tolerances, and housed in this further bore is at least one other part known as a "dead body" which is provided with an accurate blind bore in which slides a portion of the piston of another diameter. A cover closes the further bore and ensures the fluid-tightness of the cylinder. The various cylindrical portions of the piston unequal diameter slide, with a smooth and fluid-tight action, almost without play and without hard spots, in bores formed in the various parts of the cylinder.

8 Claims, 4 Drawing Figures

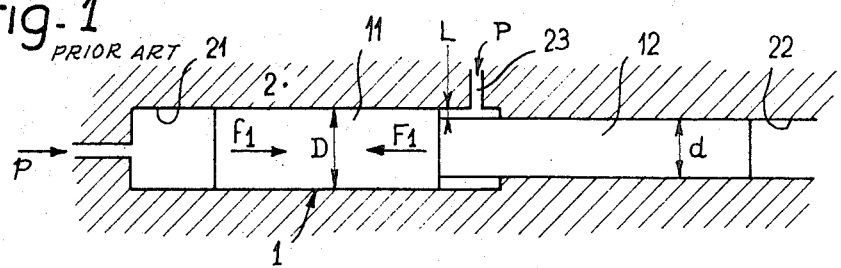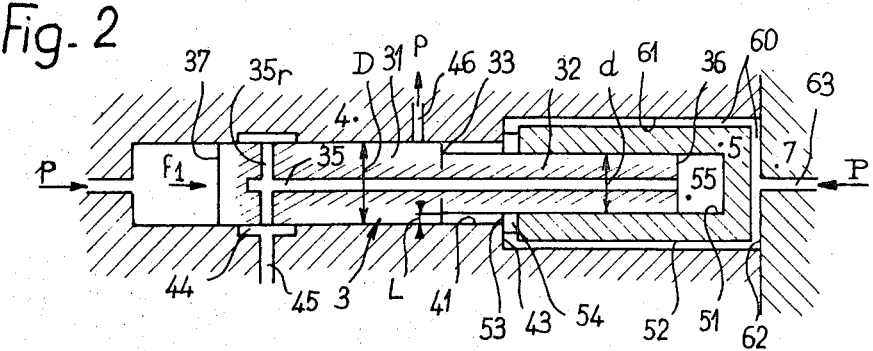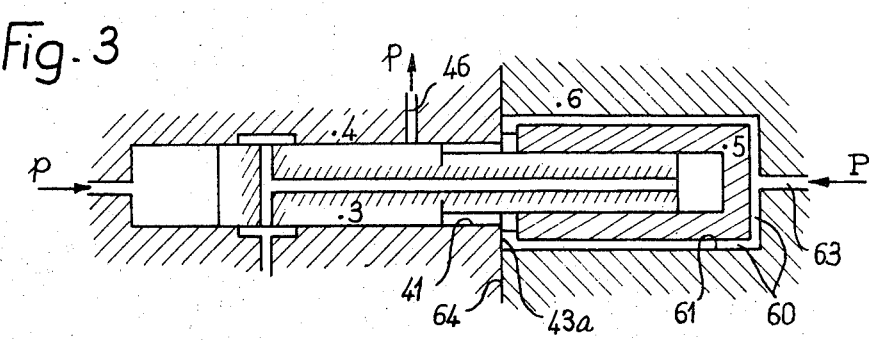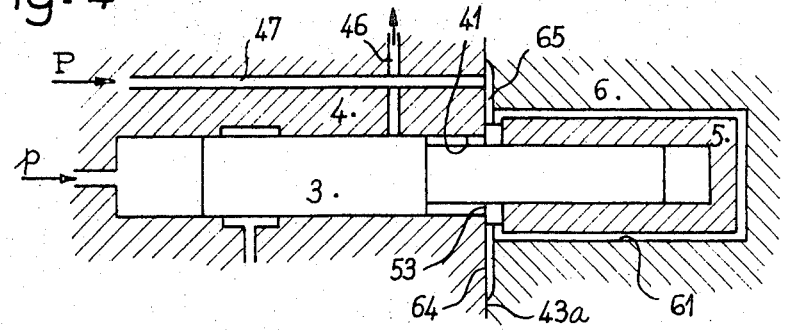

IMPROVEMENTS IN FLUID VALVE MEANS HAVING A DIFFERENTIAL PISTON ASSOCIATED WITH A DEAD BODY

BACKGROUND OF THE INVENTION

The present invention relates to a fluid valve means for the distribution or regulation of a fluid, having a differential piston, and is more particularly concerned with the production of this piston and its bores.

It is well known to carry out the control or the regulation of a fluid under pressure by a valve which may be manually operated or controlled by a fluid or by an elastic means, with the aid of a piston sliding in a cylinder, such piston may be differential or in stages so as to utilize part of the energy passing through the device for control or the regulation.

A very simple known type of differential system comprises a piston having a portion formed with a large diameter and another portion formed with a small diameter. This piston is enclosed in a cylinder provided with staged bores respectively corresponding to the diameters of the piston, their bearing surfaces being forced to slide smoothly one inside the other, without any hard spots, and almost without clearance, so as to be fluid-tight to the applid pressure fluid.

The pressure P of a fluid introduced into the cylinder develops a force F1 which acts on the piston through a ring, the width of which is equal to the difference between the radii of the large and small diameters of the differential piston.

A force f1, acting in opposition to F1, either so as to balance and maintain the piston, or to displace this piston, may be applied manually or by an elastic means (for example a spring) or developed by a pressure p of fluid acting on the end surface of the large diameter portion of the piston.

When the pressure P is high or very high, the dimensions of the ring of width L are reduced in order to avoid the necessity of applying a force f1 which otherwise would be very large, and for a very high pressure P, very small values of L are employed, of the order of a few tenths of a millimeter and for diameters of a few millimeters, in order to give an approximate example.

It is however at this point that a problem is encountered, and this importance increases as the dimensions become smaller, due to the tolerances of manufacture and the geometrical defects necessitated by the condition of operation between the co-operating diameters of the piston and of its cylinder, which is to slide smoothly and in a fluid-tight manner, almost without play and without hard points. Any defect of roundness or parallelism, of coincidence of axes or of concentricity of the stepped diameters, both on the piston and on its cylinder, results on assembly in at least one hard point which renders the system non-utilizable by creating in practice wear and seizures, which are both inevitable and unacceptable.

SUMMARY OF THE INVENTION

The present invention has for its object to provide a fluid valve means with a differential piston which overcomes these difficulties of construction and these disadvantages during use.

The fluid valve means of the present invention includes a differential piston having stepped portions of different diameters and a cylinder bored to one of these diameters.

The various cylindrical portions of unequal diameters of the piston slide with a smooth and fluid-tight action, almost without play and without hard spots in the bores formed in various elements, one of these elements being the cylinder and the other being a "dead body" which has therein an accurate blind bore.

BRIEF DESCRIPTION OF THE DRAWINGS

Other characteristic features will become apparent from the description which follows below of three embodiments of a differential piston value means in accordance with the present invention, given by way of example with reference to the accompanying drawings, in which:

FIG. 1 represents a simple differential piston of known construction;

FIG. 2 shows diagrammatically a first embodiment of the differential piston valve means according to the invention, with a "dead body" housed in the clearance of the cylinder; and FIGS. 3 and 4 show alternative embodiments of the piston shown in FIG. 2, in which the clearance about the "dead body" is formed in a casing which closes the open space of the cylinder.

DETAILED DESCRIPTION OF THE INVENTION

Referring to FIG. 1, there is shown a known differential piston 1, comprising a portion 11 of large diameter D and a portion 12 having a small diameter d. The piston slides in stepped bores 21, 22 of a cylinder 2. The fluid under pressure P passes into the cylinder through a conduit 23 and acts on the ring L of the portion 11 of the piston 1, developing the force F1. A force f1 is developed by the pressure p of a fluid (or by an elastic member) on the free face of the portion 11 of the piston.

In FIG. 2, which shows a first embodiment according to the invention, a differential piston 3 comprises a portion 31 of large diameter D and another portion 32 having a small diameter d which co-operate respectively with a first bore 41 of large diameter D in the cylinder 4 and with the blind bore 51 of small diameter of a cap 5 which will be known as the "dead body" by reason of its function described below. This cap is housed in a clearance bore 61 of the cylinder, which clearance is machined to a dimension with wide tolerances. The two parts 31, 32 of the piston 3 are delimited between each other by the working face 33 in the form of a ring of the portion 31, the width L of which may be very small, of the order of a few tenths of a millimeter.

The piston 3 comprises stepped portions, the diameter of which are formed at dimensions machined within the limits of tolerances of high precision, and of geometric defects which are very small but inevitable, such as lack of parallelism of one diameter with respect to the other, bu a very large tolerance is permitted on non-coincidence of the axes or errors of concentricity.

The blind bore 51 in the cap or "dead body" 5 enclosing the small diameter portion 32 of the piston is carried out at a dimension machined to the limits of high-precision tolerances, which comprise all geometrical defects, and is perpendicular to open face 53 of body 5. Open face 53 is provided with at least one opening or radial milled groove 54.

The bore 41 in the cylinder 4 is carried out at a dimension machined to the limits of tolerances of high precision which comprise all geometric defects, and a shoulder 43 is formed perpendicular to bore 41. The clearance bore 61 in the cylinder form is effected at a dimension which ensures a space 60 around the "dead body" 5 and, for that reason, is machined to wide limits of tolerances.

A cover 7 closes in a fluid-tight manner the open face 62 of the clearance bore 61 of the cylinder. Cover 7 may be provided with an inlet 63 in the londitudinal axis for the introduction of the fluid.

The perpendicularity of the shoulder 43 of the cylinder 4 with the bore 41, and that of the face 53 of the "dead body" with the bore 51 are necessary in order that the contact of these two faces does not impose some bending stress during the course of operation, under the effect of the pressures applied, especially on the "dead body."

The pressure P of the fluid which is introduced into the space 60 develops forces on the "dead body" 5. The axial resultant of these forces causes dead body 5 (due to the difference in the radial working surfaces of its extremities) by its face 53 to contact the shoulder 43 of the cylinder. The radial resultant of these forces is zero, which defines the "dead body" immersed in the fluid under pressure.

The fluid under pressure P having passed through the space 60 around the "dead body," traverses the milled grooves 54 so as to reach the working face 33 of the piston 3, on which the pressure P develops forces. Their axial resultant F1 pushes the piston (due to the difference between the large and small diameters defined by the differential surface 33 in the form of a ring) towards the interior of the cylinder 4, and their radial resultant is zero, but the "dead body" 5 prevents the pressure P from developing any force on the face 36 of the extremity of this piston by isolating it from this pressure.

The piston is preferably provided with an axial drilled hole 35 coupled to a radial drilled hole 35r, so as to connect the chamber 55 to atmospheric pressure, this chamber being defined in the internal bore 51 of the "dead body" between the end face 36 of small diameter of the piston 3 and the bottom of this bore, through the intermediary of the clearance 44 and of an outlet conduit 45 in the body of the cylinder 4.

The axial force F1 developed on the differential piston by the pressure P may be utilized:
  either for the control of a valve or of a mechanism controlled by this pressure P, the fluid under pressure being able to pass out through a radial conduit 46 of the cylinder 4;
  or for the auto-regulation of this pressure P by the balancing of this force F1, this balancing being obtained:
    either by the oppositely-acting force f1 of an elastic means such as a spring;
    or by the oppositely-acting force f1 developed by a servo-control pressure p, not relatively high, acting directly or indirectly on the end working face 37 of the portion 31 of large diameter of the piston 3.

It is clear that the fluid under pressure P may be introduced axially or radially, for example through the cover 7, equally well as from any point of the face 60. Similarly, the fluid under pressure p may be introduced axially or radially at any particular point towards the bottom, which may be blind, of the bored cylinder 41.

FIG. 3 shows another embodiment of the invention, in which the clearance bore 61 is formed in a casing 6, in which the fluid-tight junction with the cylinder 4 may preferably be carried out at the level of the face 43a of cylinder 4. An alternative form of this construction, as shown in FIG. 4 permits the inlet of the fluid under pressure P through a conduit 47 which passes through the body of the cylinder 4, opening out at the joint between this cylinder and the casing 6 when their respective faces 43a and 64 only co-operate in the fluid-tightness of the cylinder at a certain distance from the clearance bore 61, and finally terminates in a clearance 65 which may be formed in the face 43a or in the face 64, for example.

The present invention is not in any way limited to the foregoing description but also covers all the alternative forms, both in the arrangement or the geometrical form of the device and in the spirit of its use. In particular, the force f1 may be a constant or a variable, and this variable may be a simple or complex or even a hazardous function.

By way of example only, it may be indicated that f1 can be materialized by signals representing an instantaneous number of revolutions of a motor or of revolutions of any particular vehicle wheel, or their instantaneous variation, or the variation of kinetic energy of a body in movement, or any other physical function whatever by which the fluid pressure P is to be servo-controlled.

What I claim is:

1. A differential piston fluid valve comprising:
  a cylinder means having therein a bore with a first end and a second end and including a first portion and a second portion, at least one of said portions of said bore having a first diameter;
  a dead body having a closed end and an open end and positioned in said second portion of said bore of said cylinder means to longitudinally slide therein, the clearance between said dead body and the wall of said second portion of said bore of said cylinder means being of a dimension to allow the passage therethrough of fluid, said dead body having therein a blind bore extending longitudinally from said open end to a position short of said closed end;

a differential piston having a first portion of a diameter substantially equal to said first diameter of said cylinder means and a second portion having a diameter smaller than said diameter of said first portion of said piston and substantially equal to the diameter of said blind bore of said dead body, said first and second portions of said piston being separated by a shoulder, said piston being positioned with said first portion thereof slidably mounted in a fluid-tight manner within said first portion of said cylinder means and with said second portion of said piston slidably mounted in a fluid-tight manner within said blind bore of said dead body;
  fluid inlet means opening into said clearance between said dead body and said wall of said second portion of said bore of said cylinder means for selectively supplying fluid under pressure thereto for moving said dead body toward said first portion of said cylinder means and for moving said piston within said bore in a direction away from said dead body;

a fluid outlet communicating with said first portion of said bore of said cylinder means; and cover means cooperating with said cylinder means to close said bore thereof.

2. A differential piston fluid valve as claimed in claim 1, wherein the surface of said open end of said dead body is perpendicular to the axis of said blind bore thereof, said open end having at least one fluid opening therein.

3. A differential piston fluid valve as claimed in claim 1, wherein said second portion of said bore of said cylinder means has a diameter greater than the diameter of said first portion of said bore of said cylinder means; and further comprising an end face joining said first and second portions of said bore of said cylinder means, said end face being perpendicular to the axis of said bore of said cylinder means.

4. A differential piston fluid valve as claimed in claim 1, wherein said fluid under pressure is prevented from contacting the end of said piston of said second portion thereof by the fluid-tight contact between said dead body and said second portion of said piston.

5. A differential piston fluid valve as claimed in claim 4, wherein said cylinder means comprises a cylinder body having therein said first and second portions of said bore; and said cover means comprises a cover plate engaged with said cylinder body in a fluid-tight manner.

6. A differential piston fluid valve as claimed in claim 4, wherein said cylinder means comprises a cylinder body having therein said first portion of said bore, said cylinder body having an end face, and a casing having therein said second portion of said bore, said casing comprising said cover means and abutting said end face of said cylinder body in a fluid-tight manner.

7. A differential piston fluid valve as claimed in claim 4, further comprising a cavity formed in the abutting surfaces of at least one of said cylinder body and said casing.

8. A differential piston fluid valve as claimed in claim 7, wherein said fluid inlet means extends through said cylinder body into said cavity.

* * * * *